United States Patent
Milbourn

[11] 3,881,611
[45] May 6, 1975

[54] LOADING APPARATUS

[76] Inventor: Thomas Henry Milbourn, Walby Cottage, Crosby-on-Eden, Carlisle, Cumberland, England

[22] Filed: Aug. 29, 1973

[21] Appl. No.: 392,452

[52] U.S. Cl. ............ 214/17 CA; 198/125; 214/6 G
[51] Int. Cl. ........................................... A01f 25/00
[58] Field of Search ........ 214/17 CA, 6 G; 53/59 R, 53/61; 198/125; 271/200, 201, 198, 199

[56] References Cited
UNITED STATES PATENTS
| | | | |
|---|---|---|---|
| 2,800,991 | 7/1957 | Manierre | 198/125 |
| 3,463,330 | 8/1969 | Roberts | 214/6 G |
| 3,628,787 | 12/1971 | Boeve | 271/201 |

FOREIGN PATENTS OR APPLICATIONS
| | | | |
|---|---|---|---|
| 280,305 | 11/1927 | United Kingdom | 214/17 CA |
| 1,280,206 | 11/1961 | France | 214/6 G |

Primary Examiner—Albert J. Makay
Assistant Examiner—G. L. Auton

[57] ABSTRACT

A conveyor for receiving on one end thereof articles, for example potatoes, from a loader and for delivering said articles from the other end into a container, the conveyor incorporating a constantly probing mechanism which monitors the distance between the delivery end of the conveyor and the top of the pile of articles and causes the delivery end of the conveyor to be raised to maintain said distance within predetermined limits.

8 Claims, 3 Drawing Figures

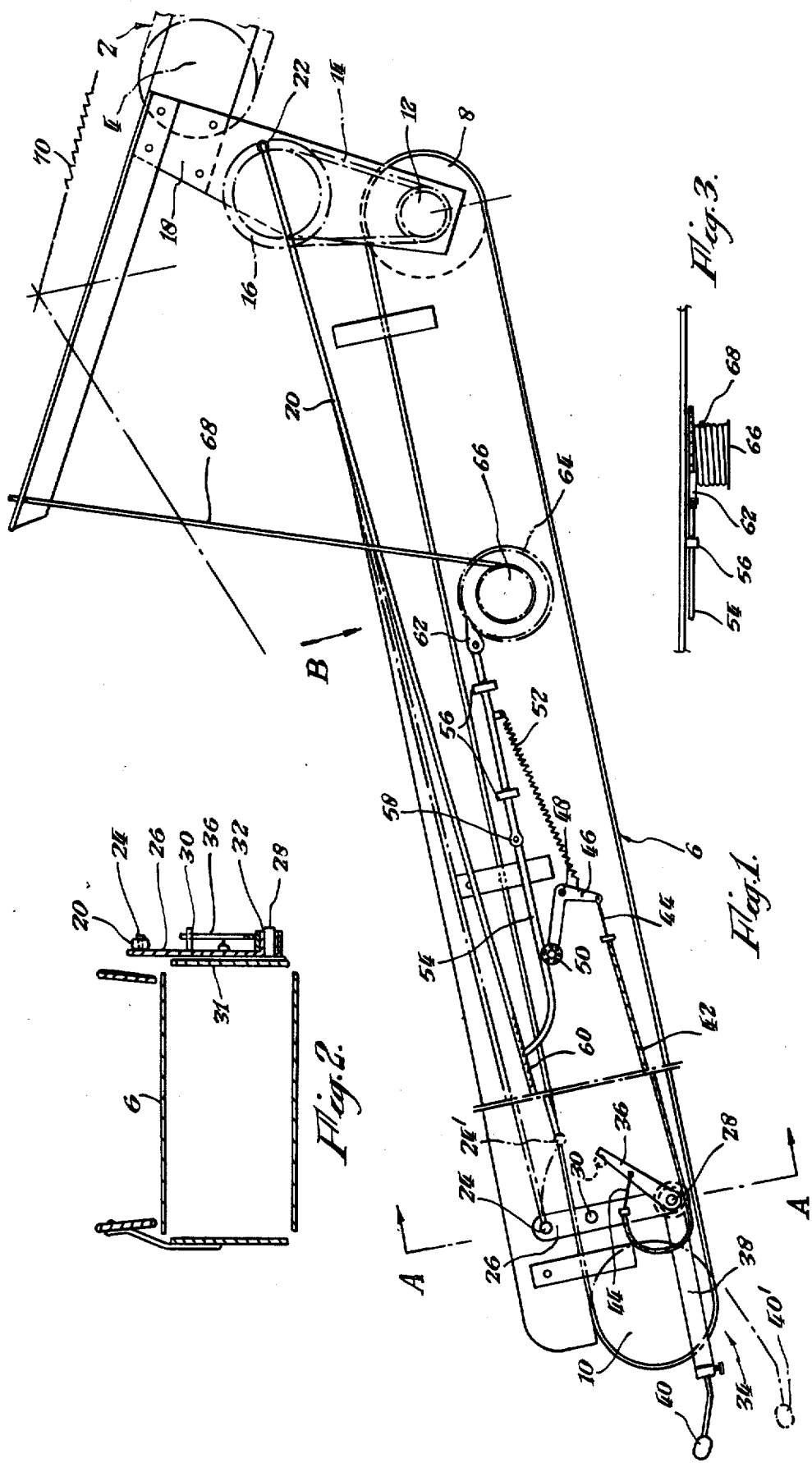

LOADING APPARATUS

This invention relates to loading apparatus, and more particularly to such apparatus for use in conjunction with machines which drop articles from a delivery point to a storage position below said delivery point.

Such machines may be, for example, potato loaders which deliver potatoes along a conveyor to a drop-off point, from which they fall into a container. It will be appreciated that damage to the potatoes can quite easily occur if the distance through which they have to fall is excessive.

According to the present invention, I provide loading apparatus comprising a conveyor adapted to receive articles at or adjacent one end and to deliver said articles from the other end to a position below that other end, and a probe located below the other end of the conveyor and adapted to reciprocate continuously to monitor the distance between the top of the pile of articles and the other end of the conveyor, said probe and conveyor being interconnected in such a manner that, once said distance decreases to a pre-set minimum value, control means are actuated by the probe to raise said probe and other end of the conveyor to increase said distance to a pre-set maximum value.

Conveniently the probe is interconnected with, to be reciprocated by movement of, the conveyor, while the means to raise the conveyor may comprise a hydraulic ram.

By way of example only, the invention will now be described in greater detail with reference to the accompanying drawings of which:

FIG. 1 is a side view of loading apparatus according to the invention;

FIG. 2 is a section on the line A—A of FIG. 1, and

FIG. 3 is a view on arrow B of FIG. 1.

The loading apparatus of the invention, which, in the following description, will be detailed in relation to the transport and storage of potatoes, is used in conjunction with a standard potato delivery elevator or conveyor 2 on a loading machine. Normal practice is to pass the potatoes along the conveyor 2 to the delivery end 4 and allow the potatoes to fall from said end 4 into a container. Heretofore, adjustment, if provided, of the height of the conveyor 2 above the container, has been in the hands of the machine operator, who may or may not effect said adjustment. Failure to do so, and allowing the potatoes to fall through an excessive distance, can and does lead to damage of the potatoes.

In order to maintain a substantially constant distance through which the potatoes have to fall, a further conveyor 6 is positioned below the conveyor 2 so that the potatoes roll from the end 4 of the conveyor 2 onto the receiving end 8 of the conveyor 6. The conveyor 6 slopes downwardly from the end 8 to the delivery end 10, the belt of the conveyor being provided with transverse ribs to prevent the potatoes rolling down the conveyor.

The receiving end 8 of the conveyor 6 is fixed relative to the conveyor 2, the conveyor 6 being pivotable about said end 8.

The tail shaft of the conveyor 6 carries a sprocket wheel 12 rotatable therewith, a drive chain 14 extending round said wheel 12 and round a further, larger sprocket wheel 16 rotatably mounted between a pair of fixed brackets one of which is shown at 18. One end of a connecting rod 20, extending substantially the length of the conveyor 6, is pivotally mounted at 22 to, at a point adjacent the periphery of, said wheel 16.

The other end of the rod 20 is pivotally mounted, at 24, to one end of a lever 26, the other end of said lever being mounted on a pivot pin 28 on the side plate 31 of the conveyor 6 (see FIG. 2). Thus it will be appreciated that rotation of the wheel 16 results in reciprocating, substantially longitudinal movement of the rod 20 and consequent reciprocating angular movement of the lever 26 about the pin 28. The lever 26 is shown in its rest position and the connecting rod is shown in dotted lines in its rest position and in full lines in its fully displaced position, the connecting rod 20 at its connection with lever 26 thus moving between the points shown at 24 and 24'. A striker arm 30 projects outwardly from an intermediate region of the lever 26 as best seen in FIG. 2.

Pivotally mounted on an extended bush 32 on the lever 26, which bush itself pivots on the pin 28, is a probe indicated generally at 34 and comprising integral abutment arm 36, carrier arm 38 and probe head 40. In its normal rest position, the abutment arm 36 engages with the striker arm 30 on the lever 26 (when the latter is in its full line FIG. 1 position, the carrier arm 38 and head 40 being integral with the abutment arm then being in the lowermost position shown in dotted lines in FIG. 1. With the striker arm in its fully displaced position (see dotted striker arm 30 position in FIG. 1), the probe is positioned as shown in full lines in FIG. 1, the probe head thus being reciprocated between the positions shown at 40 and 40'. The weight of the carrier arm 38 and probe 40 is such as to tend to retain the abutment arm 36 in contact with the striker arm 30 on return of the lever 26 to its rest position. Thus the probe 34 always tends towards the lowermost position of the probe head shown at 40'.

The arrangement so far described is such that a continuous probing motion is imparted to the head 40 as the conveyor 6 moves.

As potatoes fall off the conveyor 6 to form a pile below the delivery end of said conveyor, the probe head 40 is continuously moving. Thus the probe can detect the top of the pile at any given time providing said pile terminates at or above the rest position of the probe - i.e. with the head as shown at 40'. The continuous movement of the probe prevents the head being buried by the potatoes.

As the height of the pile increases the probe 34 cannot return to its dotted rest position 40' with constant engagement of abutment arm 36 with the striker arm 30 as previously described since the probe head 40 will come to rest on the potatoes themselves when the pile has increased to a level above the normal rest position of probe head 40. The lever 26, however, continues to undergo its normal reciprocatory motion. Thus, it will be appreciated that, as the pile of potatoes continues to grow higher, and the probe head 40 comes to rest at positions further displaced from its normal rest position 40', the distance between the striker arm 30 at its rest position and the abutment arm 36 at its rest position increases because the pile prevents the abutment arm 36 from following the movement of striker arm 30 and lever 26 which the abutment arm would normally follow under the influence of the weight of the carrier arm 38 and probe head 40 as previously described. When this separating distance reaches a certain predetermined maximum value, or stated otherwise, when the distance between the top of the pile of potatoes and the delivery end 10 of the conveyor has reached a predetermined minimum value, a mechanism is operated to pivot the conveyor 6 upwards about its end 8 to a position in which the delivery end 10 of the conveyor is at a predetermined maximum height above the top of the pile of potatoes. The probing of the height of the pile then begins again and continues until the mechanism is again operated. Thus, it can be seen that the distance through which a potato falls never exceeds a predetermined maximum value.

In the illustrated arrangement, the mechanism comprises a Bowden cable, one end of the outer sheath 42 of which is anchored to the lever 26 and the other end of which sheath is fixed to the side plate 31 of the conveyor. One end of the inner cable 44 is fixed to the abutment arm 36 of the probe 34, while the other end of said cable is attached to one end of an angular control lever 46 pivotally mounted at 48 to the conveyor side plate 31 and having a roller 50 mounted on its other end. It will be appreciated that as the distance between the lever 26 and abutment arm 36 increases in the rest position of lever 26 and under the influence of a rising pile, the inner cable 44 is effectively withdrawn from the outer sheath 42 thereby rotating the control lever 46 in a clockwise direction about the pivot 48 against the bias of a return spring 52. Thus the roller 50 by virtue of the movement of control lever 46 about its pivot 48 is raised as said distance increases.

Resting on the upper surface of the roller 50 is an actuator rod 54 the rear portion of which is guided for longitudinal movement by a pair of brackets 56 on the conveyor side plate 31, the front portion of said rod being pivoted at 58 to said rear portion. An intermediate extent of the lower surface of the connecting rod 20 is formed with a plurality of ratchet teeth 60, the forward end of the rod 54 being bent upwardly and shaped to seat in said teeth in such a manner that, on said engagement and on rearward movement of the rod 20, the actuator rod 54 is itself moved in a rearward direction. The arrangement is such that said engagement of rods 20 and 54 is effected by the Bowden cable/lever 46 when the distance between the top of the pile of potatoes and the delivery end 10 of the conveyor 6 has reached said minimum value.

Mounted on the rear end of the rod 54 is a pawl 62 which, on said rearward movement of the rod 54, engages with the teeth of a ratchet wheel 64 mounted on the conveyor side plate 31 to rotate said wheel in a clockwise direction as viewed in FIG. 1. Rotatable with the wheel 64 are a pair of cable drums one which is shown at 66, the ends of a pair of cables 68 being attached one to each drum, the other end of said cables being fixed. Thus, on rotation of the drum 66 the conveyor 6 is pivoted upwards about its receiving end 8 by the cables 68, said raising occurring on the rearward stroke of the rods 20 and 54 until the probe 34 can return to a lowermost position in which the Bowden cable/lever 46 mechanism does not cause the shaped end of the rod 54 to engage with the teeth 60 on the rod 20. A ratchet mechanism 70 on the conveyor 2 and associated with the cable hoist ensures that the conveyor 6 remains in its raised position once said position is reached.

Clearly any one of a number of mechanisms, whether hydraulic, electrical or mechanical, may be actuated to raise the conveyor 6, the important feature of this mechanism being that it is actuated when the inner cable 44 of the Bowden cable is displaced relative to the outer sheath 42 beyond a predetermined maximum amount.

What I claim and desire to protect by Letters Patent is:

1. In a loading apparatus comprising an endless conveyor having a receiving end and a delivery end, said conveyor being drivable to transfer articles loaded onto the receiving end along the conveyor for delivery to a pile of said articles positioned below said delivery end, said conveyor carrying probe means pivotally mounted thereon adapted to sense the location of said pile and control means operatively connected to said probe means and adapted to raise the delivery end of said conveyor in response to the location of articles in said pile relative to said probe means, the improvement which comprises connecting rod means reciprocable concurrently with the movement of said conveyor, said connecting rod means being operatively connected to said probe means and adapted to continuously pivot said probe means cyclically upwardly and downwardly through a substantially vertical arc to thereby continuously monitor the distance between the top of the pile of articles and the delivery end of the conveyor, and link means interconnecting said probe and control means in such manner that, once said distance decreases to a pre-set minimum value, the control means are actuated to raise said probe and delivery end of the conveyor to increase said distance to a pre-set maximum value.

2. Loading apparatus as claimed in claim 1 in which a lever is pivotally mounted on said conveyor and is adapted to be angularly reciprocated by said connecting rod means, said probe means being angularly reciprocable by said lever through a path the extent of which is determined by the distance between the top of the pile of articles and the delivery end of the conveyor, the link means interconnecting the probe means, the said lever and the control means in such a manner that, once the probe means detects that the distance between the top of the pile of articles and the delivery end of the conveyor has reached said pre-set minimum value, the control means are actuated.

3. Loading apparatus as claimed in claim 2 in which the link means comprises a Bowden cable the outer sheath of which extends between the lever and a fixed point on the conveyor and the inner cable of which extends between the probe means and the control means, the arrangement being such that, when the distance between the top of the pile of articles and the delivery end of the conveyor reaches said pre-set minimum value, the probe means is shifted angularly to a position where it cannot be angularly reciprocated by said lever and whereby the Bowden cable actuates the control means.

4. Loading apparatus as claimed in claim 3 in which the angular reciprocation of said lever is effected by said connecting rod one end of which is attached to said lever and the other end of which is linked to rotary drive means for the conveyor, said rod having a toothed extent, the control means comprising an actuation rod having a pawl on one end thereof, actuation of the control means bringing said pawl into engagement with the toothed extent of the connecting rod whereby the movement of said rod is transmitted to said actuator rod, which rod in turn actuates a lifting device to raise the probe means and delivery end of the conveyor.

5. Loading apparatus as claimed in claim 1, wherein said conveyor comprises an endless belt carried by a pair of rotatable shafts mounted in side plates and located respectively at the receiving and delivery ends thereof, one of said shafts carrying a first sprocket wheel rotatable therewith, a drive chain extending about said sprocket wheel and about a second sprocket wheel mounted between a pair of fixed brackets, one end of said connecting rod means being pivotally mounted on said second sprocket wheel at a point adjacent the periphery thereof, a lever being pivotally mounted adjacent one end thereof upon one of said side plates, the other end of said connecting rod means being pivotally connected to the free end of said lever, said lever being provided at an intermediate region thereof with an outwardly projecting striker arm, said lever having an extended bushing concentric with the pivot axis thereof and said probe means being pivotable about said bushing by engagement with said striker arm upon pivotal movement of said lever.

6. Loading apparatus as claimed in claim 5, wherein said probe means comprises an abutment arm mounted pivotally on said extended bushing, a carrier arm integral therewith and extending angularly therefrom and a probe head, the combined weight of said abutment arm, carrier arm and probe head being such as to tend to bias said abutment arm into contact with said striker arm when said lever is in its rest position.

7. Loading apparatus as claimed in claim 6, wherein one end of the sheath of a Bowden cable is secured to said lever and the other end of said sheath is secured to said one side plate, one end of the cable carried within said sheath is secured to an intermediate portion of said abutment arm and the other end of said cable is attached to one end of an angular control lever pivotally mounted on said one side plate between said first sprocket wheel and said abutment arm, said control lever being pivotable to effectuate a raising of the delivery end of said conveyor upon reciprocation of said connecting rod when the upper lever of articles in said pile of same has risen to the point where the distance between the top of said pile and said delivery end of the conveyor has reached a predetermined minimum value.

8. Loading apparatus as claimed in claim 7, wherein an actuator rod is mounted on said one side plate, an intermediate portion of said connecting rod being formed with a plurality of ratchet teeth, a segment of said actuator rod being formed and positioned to be urged into seating relationship within the teeth of said ratchet by said control lever but to be normally out of engagement therewith as long as a predetermined minimum distance is maintained between the top of said pile of articles and said delivery end of the conveyor, a second segment of said actuator rod being adapted to function as a pawl to move axially so as to rotate a cable drum carried by at least one of said side plates, rotation of said drum serving to raise said delivery end of said conveyor by means of a cable wrapped therearound.

* * * * *